No. 613,090. Patented Oct. 25, 1898.
C. H. STEARN & C. F. TOPHAM.
APPARATUS FOR PRODUCING RADIATION OF ELECTRICITY.
(Application filed Dec. 20, 1897.)
(No Model.)
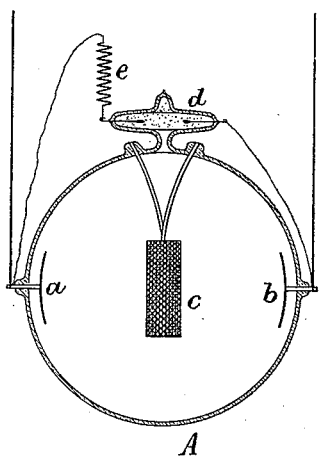
Witnesses
Inventors
Charles H. Stearn,
Charles F. Topham,
their attorneys

UNITED STATES PATENT OFFICE.

CHARLES H. STEARN AND CHARLES F. TOPHAM, OF LONDON, ENGLAND; SAID TOPHAM ASSIGNOR TO SAID STEARN.

APPARATUS FOR PRODUCING RADIATION OF ELECTRICITY.

SPECIFICATION forming part of Letters Patent No. 613,090, dated October 25, 1898.

Application filed December 20, 1897. Serial No. 662,573. (No model.) Patented in England September 24, 1896, No. 21,218.

*To all whom it may concern:*

Be it known that we, CHARLES H. STEARN, electrician, and CHARLES F. TOPHAM, engineer, subjects of the Queen of Great Britain and Ireland, residing at 47 Victoria street, Westminster, London, England, have invented certain Improvements in or Connected with Means or Apparatus for Producing Radiation of Electricity, (for which we have obtained a patent in Great Britain, No. 21,218, dated September 24, 1896,) of which the following is a specification.

If an electric current of high potential be passed through a vessel exhausted of air or other gas and between electrodes suitably shaped, one or both being concave, a solid body placed at or near the center of curvature of the cathode becomes incandescent at a certain stage of exhaustion or attenuation of the air or gas, and at a higher degree of vacuum or attenuation of the air or gas in the said vessel the said solid body becomes phosphorescent to a greater or less degree, according to the nature of the solid body employed. At a still higher vacuum or attenuation of the said air or gas certain substances emit or direct the rays known as "Röntgen" or "X" rays. On account of the speedy rise in the degree of vacuum or attenuation of the air or gas in the said vessel, owing to the absorption of the air or gas present, permanent effects of radiation in the required manner are not attainable unless means be provided whereby the condition of the vacuum or attenuation of the air or gas in the said vessel is rendered constant or practically constant. This can be effected by combining with the electric circuit a device such that on the vacuum becoming or tending to become too high to fulfil the required conditions the alteration in the electric conditions in the said circuit cause the necessary small traces of air or other gas to lower the vacuum to the required degree or maintain it normal to be supplied to the said vessel. This is conveniently effected by placing in communication with the said vessel a substance which when an electric spark is passed through it will evolve the necessary small traces of air or other gas to make up deficiency, this sparking being caused only when the resistance through the vessel increases, owing to the rise in the degree of vacuum to such a point as to cause current to pass through a by-pass or shunt, so as to produce the sparking. Our invention in the first place provides a simple and efficient arrangement for the purpose.

The accompanying diagram will serve to assist the description.

We attach to or form with the vessel A, in which the vacuum is created, (we will refer to this as the "main" vessel,) and which contains the cathode or cathodes $a$ and $b$ and intercepter or solid body $c$, as aforesaid, an extension or communicating chamber $d$, containing a material which under the action of an electric spark will evolve small traces of air or other gas. This material will be of a nature in accordance with the gas which it is desired to liberate. Chlorate of potash or an ammonium salt are, for instance, suitable for the purpose. The terminals or electrodes between which the sparking is effected are in a shunt-circuit from the principal circuit, and the said terminals are fused in the walls of the said communicating chamber, and in this shunt-circuit is any suitable resistance $e$, such that the total resistance in the shunt-circuit is slightly greater than that to be maintained in the vessel A. So long as the vacuum in and consequently the electric current through the main vessel A remains normal the devices in the shunt or by-pass are inoperative; but as soon as the vacuum becomes too high, so that the resistance through the main vessel A becomes abnormal, the current passes by the shunt or by-pass and sparking occurs in the aforesaid communicating chamber $d$, so that from the substance therein a small trace of air or other gas is evolved, which restores the vacuum in the main vessel to its normal condition. By regulating the resistance in the shunt or by-pass the degree of vacuum in the main vessel A can be maintained at any desired point.

Other means may be employed for allowing current to pass to create the sparking at the requisite time. For example, we may use a galvanometer or equivalent device in the primary or secondary circuit of a transformer, which by the reaction produced by the fall-in off of current due to the rise of vacuum in the main vessel causes the galvanometer or equivalent device to complete the circuit and send a current through the sparking device.

The luminous effects hitherto obtained from the incandescence of solid bodies under the influence of cathode-rays have been too weak and fluctuating for application to practical lighting purposes, and with platinum, which is the material hitherto proposed as the solid body or anticathode, the current which is necessary to render it incandescent is beyond the range of practical application, and even if this were not the case the current disintegrates the platinum and blackens the bulb so that the lamp is useless. We obtain a very high degree of incandescence with comparatively small expenditure of electric energy by employing for the anticathode materials which can be rendered incandescent by means of currents which are practically available, such as refractory oxid of thorium or other refractory oxids or earths similar, for example, to those used for the Auer von Welsbach incandescent gas-lamps, either in the form of compressed disks or preferably of several thicknesses of the spongy material which results from immersing carbonizable fabrics in solutions of the rare earths or other refractory oxids and afterward burning out the organic matter.

We may use a single concave cathode in the main vessel and direct currents with an induction-coil and contact-breaker; but much more powerful light effects can be obtained by employing an alternating current from a transformer as the source of electric energy and placing the anticathode between two curved or concave aluminium electrodes, each of which under the reversals of the electric current will alternately become the cathode. The anticathode will then be rendered luminous on both sides, and the light will be absolutely steady.

Having now particularly described and ascertained the nature of this invention and in what manner the same is to be performed, we declare that what we claim is—

1. In a lamp or illuminating device for giving light by the action of cathode-rays on an anticathode, the combination with an exhausted vessel, of a cathode within said vessel, an anticathode also within said vessel made of a material—such as refractory oxid of thorium or other refractory oxids or earths—which can be rendered incandescent by currents which are practically available for lighting purposes, substantially as described.

2. In a lamp for giving light by the radiation from a cathode impinging on an anticathode, the combination with an exhausted vessel, of a cathode within said vessel, an anticathode also within said vessel, made of a material—such as refractory oxid of thorium or other refractory oxid or earth—which can be rendered incandescent by currents which are practically available for lighting purposes, and means for automatically maintaining a constant or approximately constant vacuum or degree of attenuation of the gas in the exhausted vessel, substantially as described.

3. In a lamp or illuminating device for giving light by the action of cathode-rays on an anticathode, the combination with an exhausted vessel and the principal circuit having two cathode terminals inclosed by said vessel, and an anticathode also inclosed by said vessel, made of a material—such as refractory oxid of thorium or other refractory oxids or earths—which can be rendered incandescent by currents which are practically available for lighting purposes, of means for automatically maintaining a constant or approximately constant vacuum or degree of attenuation of the gas or air in the exhausted vessel, said means consisting of a chamber communicating with the exhausted vessel, a shunt-circuit from and of higher resistance than the principal circuit, the terminals of the shunt-circuit passing directly into and being sealed in said chamber, and a material in said chamber capable of generating air or gas when the current passes through the chamber, whereby on the rarefaction in the main circuit rising above a given degree, air or gas is liberated and admitted to the said exhausted vessel by a spark passing through the said chamber, substantially as described.

In testimony whereof we have signed our names to this specification in the presence of two subscribing witnesses.

C. H. STEARN.
     C. F. TOPHAM.

Witnesses:
 WILLIAM FREDERICK UPTON,
 CHARLES MILLS.